(12) United States Patent
Sanders et al.

(10) Patent No.: US 11,470,122 B2
(45) Date of Patent: Oct. 11, 2022

(54) ASSIGNING PRIVILEGES IN AN ACCESS CONTROL SYSTEM

(71) Applicant: COLORADO SCHOOL OF MINES, Golden, CO (US)

(72) Inventors: Matthew Westin Sanders, Arvada, CO (US); Chuan Yue, Engelwood, CO (US)

(73) Assignee: COLORADO SCHOOL OF MINES, Golden, CO (US)

( * ) Notice: Subject to any disclaimer, the term of this patent is extended or adjusted under 35 U.S.C. 154(b) by 147 days.

(21) Appl. No.: 16/600,201

(22) Filed: Oct. 11, 2019

(65) Prior Publication Data

US 2020/0120138 A1    Apr. 16, 2020

Related U.S. Application Data

(60) Provisional application No. 62/746,090, filed on Oct. 16, 2018.

(51) Int. Cl.
| | |
|---|---|
| *H04L 67/10* | (2022.01) |
| *H04L 9/40* | (2022.01) |
| *G06N 20/00* | (2019.01) |
| *G06N 5/04* | (2006.01) |

(Continued)

(52) U.S. Cl.
CPC ............ *H04L 63/20* (2013.01); *G06N 5/003* (2013.01); *G06N 5/04* (2013.01); *G06N 20/00* (2019.01); *H04L 63/102* (2013.01); *H04L 67/10* (2013.01); *H04L 67/60* (2022.05)

(58) Field of Classification Search
None
See application file for complete search history.

(56) References Cited

U.S. PATENT DOCUMENTS

| | | | |
|---|---|---|---|
| 2017/0091270 A1* | 3/2017 | Guo | G06F 16/24544 |
| 2019/0124590 A1* | 4/2019 | Chiang | H04L 12/2838 |

(Continued)

OTHER PUBLICATIONS

Ester, Martin , et al., "A density—based algorithm for discovering clusters in large spatial databases with noise", In Knowledge discovery in databases (KDD), vol. 96. AAAI Press, 226-231.

(Continued)

*Primary Examiner* — Cai Y Chen
(74) *Attorney, Agent, or Firm* — Dorsey & Whitney LLP (57) ABSTRACT

An access control system may include a log data parser that receives log data observations in a cloud system and extract user-permission data from the log data observations. The system may also include a clustering unit that uses the user-permission data to generate one or more clusters, each cluster associated with one or more users. Alternatively, and/or additionally, the system may include a feature extractor and a classifier. The feature extractor may extract one or more features from the user-permission data. The classifier may generate predictions of permissions for the one or more users based on the extracted one or more features. The system may also include a policy generator that uses the output of the clustering unit and/or the classifier to generate an access control policy. The policy may be executed in the cloud system to control user's access to one or more services of the system.

20 Claims, 6 Drawing Sheets

(51) Int. Cl.
*G06N 5/00* (2006.01)
*H04L 67/60* (2022.01)

(56) References Cited

U.S. PATENT DOCUMENTS

2019/0141041 A1* 5/2019 Bhabbur .............. H04L 9/3213
2019/0327271 A1* 10/2019 Saxena ................. G06N 20/00

OTHER PUBLICATIONS

Manning, Christopher D., et al., "Introduction to Information Retrieval", Cambridge University Press 2008, New York, NY, USA, 117-119.
Pedregosa, F., "Scikit-learn: Machine Learning in Python", Journal of Machine Learning Research 12 (2011), 2825-2830.

* cited by examiner

ASSIGNING PRIVILEGES IN AN ACCESS CONTROL SYSTEM

CROSS REFERENCE TO RELATED APPLICATIONS

This application claims priority under 35 U.S.C. § 119 to U.S. provisional application No. 62/746,090 entitled "Assigning Privileges in an Access Control System," filed on Oct. 16, 2018, and which is incorporated by reference herein in its entirety for all purposes.

FIELD

The present disclosure relates generally to access control systems and examples of assigning privileges in an access control system are described.

BACKGROUND

Cloud computing has revolutionized the information technology industry. Organizations leverage cloud computing to deploy IT infrastructure that is resilient, affordable, and massively scalable with minimal up-front investment. Cloud providers have seen significant growth recently with increased cloud computing industry revenue. Despite the wide adoption of cloud computing, there are still issues regarding security and usability that should be addressed.

Existing automatic methods, such as role mining problem (RMP), create role based access control (RBAC) policies by finding an optimal set of roles from existing user permissions. However, the RMP method does not address how secure or complete a policy is because the RMP method evaluates an RBAC configuration based on maintainability of the underlying policy. Completeness addresses minimizing under-privilege and security addresses minimizing over-privilege. Further, a RMP method generally assumes that given data naturally fits into an RBAC policy that is both easy to maintain and secure. This method also relies on existing or manually created user-permission assignments, which is an administrative burden. For example, a service may be associated with several dozen to several hundred privileges. Pre-generating policies require an operator to understand both the actions (available in each service), resources required by each privileged entity, as well as the granularity of access control policy available for each service.

DETAILED DESCRIPTION

Various embodiments of the present disclosure will be explained below in detail with reference to the accompanying drawings. The following detailed description refers to the accompanying drawings that show, by way of illustration, specific aspects and embodiments in which the present invention may be practiced. Other embodiments may be utilized, and structure, logical, and electrical changes may be made without departing from the scope of the present invention. The various embodiments disclosed herein are not necessarily mutually exclusive, as some disclosed embodiments can be combined with one or more other disclosed embodiments to form new embodiments.

In a cloud systems and other computing networks, when a user wishes to use or access a service of the cloud system, the system checks the user's assigned permissions against the privilege of the service that the user requests to use. For example, a cloud service, such as Amazon Simple Storage Service, may allow a user to upload a file and retrieve a file to and from the cloud. A user may be assigned a permission, and the cloud service may also have a privilege associated with a user operation. Based on the comparison of the user's permissions and the privilege of the service the user wishes to use, the cloud system may grant or deny the service to the user. In some examples, an access control system assigns permissions to a user of the cloud system based on the log data in the cloud system, where the log data records one or more user operations in the cloud system. The access control system uses the log data as available in the cloud system, parses the log data to extract user-permission data, and uses the user-permission data to generate the permissions for the users. In some examples, the access control system assigns minimal privileges that may not be unnecessarily higher than the needed privilege to a user. The access control system may use clustering to group together and assign privileges to users of a cloud based system and/or may use predicative techniques to generate privileges for users. As discussed below, these techniques help ensure users are provided adequate privileges, that will allow them access to the required features, but without being overly permissive.

Within a cloud or computing system or structure, a user may be assigned to one or more roles. Similarly, a role may be assigned to one or more users. An example of a role may include a collection of permissions. For example, a role may contain the operations that can be performed, such as read, write, and delete. Roles can be high-level, like owner, or specific, like virtual machine reader. A role may have one or more permissions, each corresponding to an operation in the role. The permissions available to a user may include the permissions assigned to the roles with which the user is associated.

In one example, in assigning the privileges to users, the access control system uses a clustering algorithm to cluster users with similar behaviors into the same cluster, e.g., users that access a particular privilege are grouped together and indicated as a particular group. Using the clusters, users are assigned privileges based on their grouping, e.g., a first cluster of users will be assigned the same permissions as one another and a second cluster of users is assigned the same privileges as one another, where the privileges of the second cluster may be different from the first cluster. The cluster privileges are determined by the permissions exercised by all of the users associated with that cluster.

Figure 1:
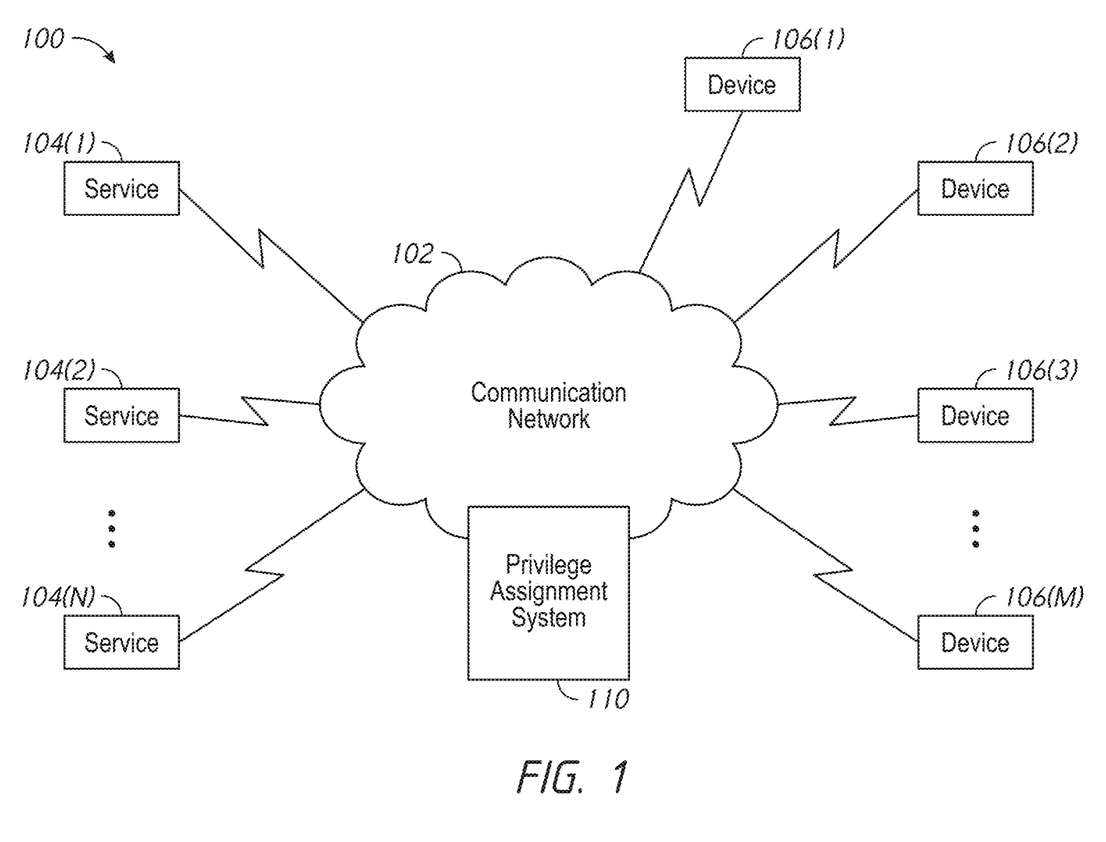
FIG. 1 is a block diagram of an example cloud system according to various aspects of the present disclosure.

In another example, in assigning the privileges to users, the access control trains a classifier or other supervised learning algorithm based on the users' past accesses to the system. For example, the access control system extracts certain features from the log data of the cloud system and uses the extracted features to train the classifier, such as a decision-tree classifier. The access control then uses the trained classifier to predict the permissions of the users of the cloud system Turning now to the figures, a system of the present disclosure will be discussed in more detail. FIG. 1 is a block diagram of an example cloud system according to various aspects of the present disclosure. A cloud system 100 may include multiple services, e.g., 104(1), 104(2) . . . 104(N) (collectively referred to as 104). A service 104 may be configured to provide one or more computing services. For example, service 104 may be a product, an application, or an IT service available for deployment on Amazon web services (AWS) or other cloud based service offerings. In a non-limiting example, a service may include a print service that executes a print job. In another non-limiting example, a service may include a game on a cloud system that the user may access and play. In another non-limiting example, a service may include an application that can be executed on the cloud system. A product may include one or more resources, such as storage volumes, monitoring configurations, databases, printers, CPU cycles, or other resources or products. The system 100 may also include multiple user devices, e.g., 106(1), 106(2), 106(3) . . . 106(M) (collectively referred to as 106). Examples of a user device may include a server device, a desktop computer, a mobile electronic device, an embedded computing device, a microcontroller, or any other suitable devices having a processor and a communication peripheral. A user device 106 may be associated with one or more users, and may communicate with one or more services 104 via a communication network 102.

The communication network 102 may be any suitable type or combination of types of communication system for transmitting data either through wired or wireless mechanisms (e.g., WiFi, Ethernet, Bluetooth, cellular data, or the like). In some examples, certain components, e.g., services 104 or devices 106, in the cloud system 100 may communicate via a first mode (e.g., Bluetooth) and others may communicate via a second mode (e.g., WiFi). Additionally, certain components may have multiple transmission mechanisms and be configured to communicate data in two or more manners. The configuration of the communication network 102 and communication mechanisms for each of the components may be varied as desired and based on the needs of a particular configuration, function, or property.

In a non-limiting example, a server device may be associated with multiple users and allow the users to have access to one or more services 104. In a non-limiting example, a mobile electronic device may be associated with a user and provide the user access to one or more of the services 104, where the access is based on an access control policy.

In some examples, the system 100 may further include a privilege assignment system 110 that generates an access control policy including one or more assigned privileges or permissions per user. The system then executes the policy generated from the privilege assignment system 110 to facilitate access control of the system 100. For example, a policy may include an assigned read privilege for a first role and a print privilege for a second role, where the first role may be associated with users A and B, and the second role may be associated with users B and C. Such policy may be applicable to RBAC. In the instant example, once the policy is executed in the system 100, a job that requires read privilege may be granted for users A and B, a job that requires print privilege may be granted for users B and C, and a job that requires both read and print privileges may be granted for user B only. A user may need to access one or more services in order to complete a computing task, in which case the privilege required by each service must be granted by a combination of the permissions of role(s) associated with the user in order for the task to be granted.

In some examples, a policy may include an assigned privilege level or tier, such as, for example, "Secret" for users A and B, and an assigned privilege level of "Confidential" for user C. Such policy may be applicable to Mandatory Access Control (MAC) based system. For example, a system may be dealing with documents marked "Confidential", "Secret", and "Top Secret" where access to the highest level implies access to lower levels as well. In such case, once the policy is executed in the system 100, users A and B may be able to access a service requiring to access "Secret" and "Confidential" document because the privilege level of users A and B are equal or above the privilege level required of the service. However, user C may not be able to access the service because the privilege level of user C (e.g., "Confidential) is below the privilege level of the service (e.g., "Secret"). A user may need to access one or more services in order to complete a computing task, in which the assigned permissions for the user must be no lower than the privilege levels of all of the services to be used in completing the task.

In some examples, the generation of the policy for the system 100 may be based on a least privilege rule under which privileged entities of a system operate using the least amount or level of privileges necessary to complete its job. In these instances, the privilege assignment system 110 assigns, minimal permissions and not unnecessarily more than the needed privilege. In some examples, the privilege assignment system 110 may retrieve from the cloud system log data that records multiple user accesses across the cloud system in one or more observations, and use the log data to generate the policy. An observation may correspond to log data that records user accesses across a cloud system in a time period, namely an observation period. In some examples, multiple observation periods, may correspond to multiple non-overlapping time periods. In other examples, multiple observations may correspond to overlapping time periods. In that case, the observations in two overlapping observation periods may include certain user access data that is common in both the first observation period and the second observation period. The privilege assignment system 110 may be configured to minimize both over-privilege and under-privilege in generating the policy.

Figure 2:
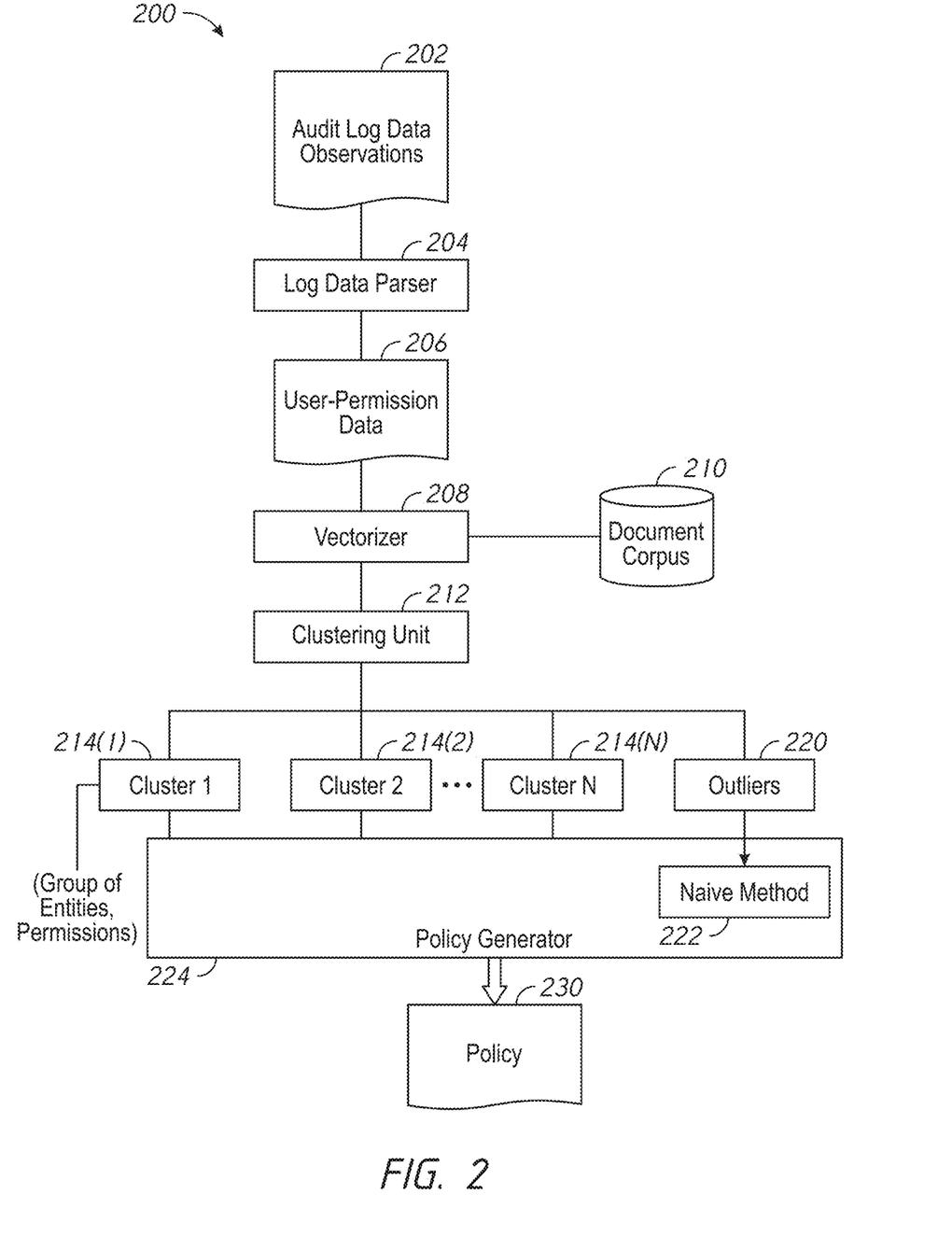
FIG. 2 is a diagram of an example privilege assignment system according to various aspects of the present disclosure.

FIG. 2 is a diagram of an example privilege assignment system, such as privilege assignment system 110 in the cloud system 100 (FIG. 1), according to various aspects of the present disclosure. In some examples, a privilege assignment system 200 may include a log data parser 204, which receives audit log data observations 202.

In some examples, the audit log data may include various information associated with operations exercised by a user. For example, in a cloud system, such as the AWS, the log data may be contained in a log file, which may include any of the CloudTrail Log File, where CloudTrail monitors events for a user account. In some non-limiting examples, the log file may record a user making a call to a server, a console backend making a call to a user, or a user making a call to an action to create a new user. A log records the identity of the user, the operations recorded in the log, the privileges/permissions associated with the operations, and/or resources utilized in the operation.

The log data parser 204 may be configured to parse the log data 202 and extract user-permission data 206. In some examples, user-permission data 206 may correspond to a user accessing any of the services in the log data. For example, the user-permission data may include a user's identity and the permission associated with the service being accessed. In some examples, the audit log data may be stored in a suitable data format, such as a flat file or a syntax based format, such as an extensive markup language (XML). In the latter case, the log data parser 204 may include an XML parser that parses the data in the XML format and extracts the user-permission data. The extracted user-permission data 206 may be stored in a memory location in any suitable format, such as a flat file, an XML file, or other suitable formats.

In some examples, the system 200 may further include a clustering unit 212 that clusters the audit log data. For example, the clustering unit may receive the user-permission data 206, analyze the data, and determine clusters of similar privileged entities based on the permissions exercised. In the example in FIG. 2, the output of the clustering unit 212 may include one or more clusters, e.g., 214(1), 214(2) . . . 214(N). The clusters may correspond to roles. For example, a cluster may correspond to a role. In other words, the number of cluster correspond to the number of roles in the system. A cluster may include one or more users and permissions associated with each of the users. In some examples, the system 200 may further include a policy generator 224, which generates the access control policy based on the clustering results from the clustering unit 212.

In a non-limiting example, the policy generator 224 may assign each cluster a shared role and grant permissions to that cluster. This is further described as below.

determined from the user-permission data) and User 2 in Role 1 has acted with permission read (also determined from the user-permission data), then the policy generator 224 may assign permissions read and write to Role 1 in the first cluster. In some instances, the combination of similar entities results in granting additional permissions to one or more users. For example, new permissions may be assigned to a user based on the permissions exercised by other users that have behaved similarly. This is useful in environments where minimizing under-privilege is more important than minimizing over-privilege.

In some examples, after the clustering has completed for all entities/users, some entities/users may not belong to any clusters from the clustering unit 212. These entities are called outliers. In some scenarios, the policy generator 224 may include a naïve policy generator 222, which assigns permissions to the outliers. For example, the naïve policy generator 222 may grant permissions to the entities/users in the outliers based on the privileges used or exercised during the observation period. In other words, each of the entities/users in the outlier is a separate role and can be considered a cluster of one, and then is granted the same permissions that used by that entity in the observations.

With further reference to FIG. 2, the clustering unit 212 may be configured to implement any suitable clustering algorithms. For example, the clustering unit 212 may use a density-based spatial clustering of applications with noise (DBSCAN) algorithm. In a non-limiting example, an implementation of the DBSCAN may be available, such as from the scikit-learn library (see Pedregosa, F., et al. 2011. Scikit-learn: Machine Learning in Python. *Journal of Machine Learning Research* 12 (2011), 2825-2830), which was published in Martin Ester, Hans-Peter Kriegel, Jörg

```
Input: The set of user-permissions exercised (U PE) during the observation period(OBP)
Output: roles, the mapping of user-to-permission assignments
  1              roles, documents ← ∅;
  2              for user , perm ∈ U PE do
  3                   documentsuser ← documentsuser ∪ perm;
  4              end
  5              clusters, outliers ← cluster (documents );
  6              for cluster ∈ clusters do
  7                   role ← ∅;
  8                   for user , document ∈ cluster do
  9                        for perm ∈ document do
 10                             role ← role ∪ perm;
 11                        end
 12                   end
 13                   rolesuser ← role;
 14              end
 15              for user , document ∈ outliers do
 16                   for user , perm ∈ document do
 17                        rolesuser ← rolesuser ∪ perm;
 18                   end
 19              end
 20              return roles
```

In some examples, the first cluster, e.g., 214(1), may include a first shared role (e.g., Role 1) associated with User 1 and User 2. A second cluster, e.g., 224(2), may include a second shared role (e.g., Role 2) associated with User 3. The policy generator 224 may assign permissions to each of the roles in the clusters. In assigning permissions for a role, the policy generator 224 may determine the permissions of entities in that role and assign a combined permission to that role. For example, a combined permission for a role may include a combination of all of the permissions exercised by all of the users in that role. In the instant example, if User 1 in Role 1 has acted with permissions read and write (as Sander, Xiaowei Xu, et al. 1996, A density-based algorithm for discovering clusters in large spatial databases with noise, In Knowledge *discovery in databases (KDD)*, Vol. 96. AAAI Press, 226-231. The DBSCAN algorithm provides advantages in that no expected number of clusters needs to be specified in advance. The performance of DBSCAN also scales well in regards to the number of samples given.

Additionally and/or alternatively, the system 200 may include a vectorizer 208, which converts the user-permission data 206 into vectors that can be used by the clustering unit 212. For example, the vectorizer 208 may generate a document corpus 210 based on the user-permission data. The document corpus 210 may include multiple documents, where the documents include permissions exercised by an entity. A document in the document corpus 210 may also include other information collected in the log data, such as operations and resources. In some examples, once the document corpus 210 is formed, the vectorizer 208 may convert the documents in the document corpus to a feature vector for clustering. For example, the vectorizer 208 may be a term frequency-inverse document frequency (TF-IDF) vectorizer.

TF-IDF refers to an approach for finding similar documents in information retrieval (see Christopher D. Manning, Prabhakar Raghavan, and Hinrich Schütze; Introduction to Information Retrieval, Cambridge University Press 2008, New York, N.Y., USA. 117-119). A vector document produced by the TF-IDF vectorizer may include all of the permissions exercised by a user in the observation period. The vector document may also include other terms associated with user's access, such as the operations and resources utilized by the user during the observation. The TF-IDF vectorizer may determine a composite weight for each term in a document, this is sometimes referred to as TF-IDF weighting. Each term may result in one dimension in the vector space. TF-IDF weighting has advantages in that it preserves information about how often each permission is exercised by a user. The result of the vectorizer may include multi-dimensional vector features that are ready for clustering.

Returning to clustering unit 212, in some examples, the DBSCAN algorithm requires hyper-parameter for DBSCAN, such as E, the distance threshold, which is the maximum distance between two samples above which the two samples should not be considered to be in the same cluster. There can be various ways to determine the parameter E: the mean distance between all points, median distance between all points, and middle point between the minimum and maximum points in the vector space. Other ways of determining or assigning a threshold may also be possible. In some examples, an operator may also manually vary the threshold value.

Additionally, and/or alternatively, other clustering algorithms may be used. For example, a hierarchical clustering algorithm may be used in generating hierarchical roles in which users' roles may overlap. In some examples, a user may be a member of multiple roles. For example, a user is a member of a child role, which is the child of a parent role. In that case, the clustering unit 212 may use a hierarchical clustering algorithm.

Figure 3:
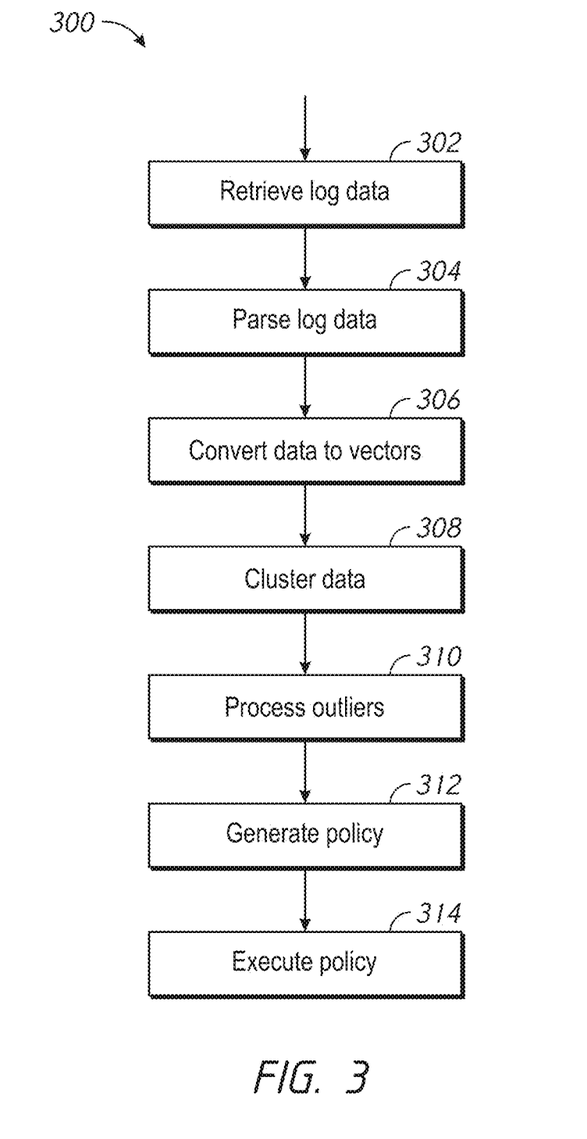
FIG. 3 illustrates an example of a process of generating a policy of access control according to various aspects of the present disclosure.

FIG. 3 illustrates an example of a process that can be implemented in a privilege assignment system, such as system 200 (in FIG. 2), to generate a policy of access control according to various aspects of the present disclosure. In some examples, process 300 may include receiving log data at 302. For example, process 300 may collect log data from users' accesses to multiple services in a cloud system (e.g., 100 in FIG. 1). The log data may be collected in an observation period in a similar manner as described in FIG. 2. The observation period may be one day period or other select length that provides sufficient time for entities to complete tasks requiring related privileges. The observation period may also vary as the tasks vary, e.g., in instances where tasks may require more than a day, the observation period can be extended or in instances where the tasks require less time the observation period may be reduced. The observation period may also be selected based on user involvement or tracking, e.g., selected to extend through an amount of time where a substantial percentage of the users have accessed the system In FIG. 3, process 300 may further include parsing log data at 304. For example, the process 300 may use the log data parser 204 (in FIG. 2) to generate user-permission data from the log data. Optionally, process 300 may further convert data to vectors at 306, where the converted vector data may be usable by a clustering unit. When converting data to vectors at 306, any suitable vectorisors, such as vectorizer 208 (in FIG. 2). In a non-limiting example, a TF-IDF vectoriser may be used. The process 300 may further include clustering the vector data at 308, from which a resulting cluster includes similar privileged entities based on their permissions exercised.

When clustering data at 308, any suitable clustering unit, such as 212 (in FIG. 2) may be used. For example, the clustering process at 308 may use a DBSCAN clustering algorithm described with reference to FIG. 2. Block 308 may generate one or more clusters. In a non-limiting example, a cluster may include one or more users. Similar to the clustering unit described in FIG. 2, the DBSCAN algorithm may require hyper-parameter, such as E, the distance threshold, which is the maximum distance between two samples above, which the two samples should not be considered to be in the same cluster. Block 308 may use various ways to determine the parameter E. For example, the threshold may have a value that is the mean distance between all points, a value that is the median distance between all points, or a value that is the middle point between the minimum and maximum points in the vector space. In some examples, box 308 may also use other suitable clustering algorithms, such as a hierarchical clustering algorithm.

The process 300 may further generate a policy at 312. For example, the process 300 may generate the policy using a policy generator previously described, such as 224 (in FIG. 1). In generating the policy, block 312 may assign a role to a cluster, for example, and may also assign permissions to a role. In some examples, block 312 may assign permissions for a role, for example, by determining all of the permissions of all entities in that role and assign a combined permission to that role. This may be implemented in a similar manner as policy generator 224 described in FIG. 2.

With further reference to FIG. 3, additionally, and/or alternatively, process 300 may also process outliers at 310 as the result of clustering process 308. Outliers may include entities that do not belong to any of the clusters from the clustering block at 308, in which case an entity belongs to a single cluster. In processing the outliers, block 310 may assign an outlier as a separate role, and use a naïve policy method to assign permissions to that role. For example, the process may grant permissions to the entities in the outliers based on the privileges they used during the observation period. In other words, an entity in the outliers is a separate role and is granted the same permissions that were used by that entity in the observations.

In FIG. 3, process 300 may further execute the policy at 314. For examples, the policy generated from the block 312 may include the assignment of roles and the assignment of permissions for each role, where a role is associated with one or more users. When the policy is executed in the cloud system (e.g., 100 in FIG. 1), a user may be associated with a role, and a role is associated with one or more permissions. The cloud system may determine, based on the policy, whether the user's operations should be granted. For example, when a user attempts to send a print job to a printer, the cloud system compares the set of privileges required to execute the print job requested and the permissions of the role(s) assigned to the user. If all of the privileges required by the print request are granted by the combination of all roles associated with the requesting user then the requested job is granted. In an example, a user may be associated with two roles: an owner, which has a print permission; and a virtual machine reader, which has a read permission in a virtual machine. A requested print job may require a permission to read from the virtual machine and a print permission. In such case, the combination of both roles of the user may include the required privileges of the print request. Consequently, the requested job may be granted. If not all of the required privileges of the print job are granted by the combination of all roles associated with the requesting user, then the print job is not granted.

Figure 4:
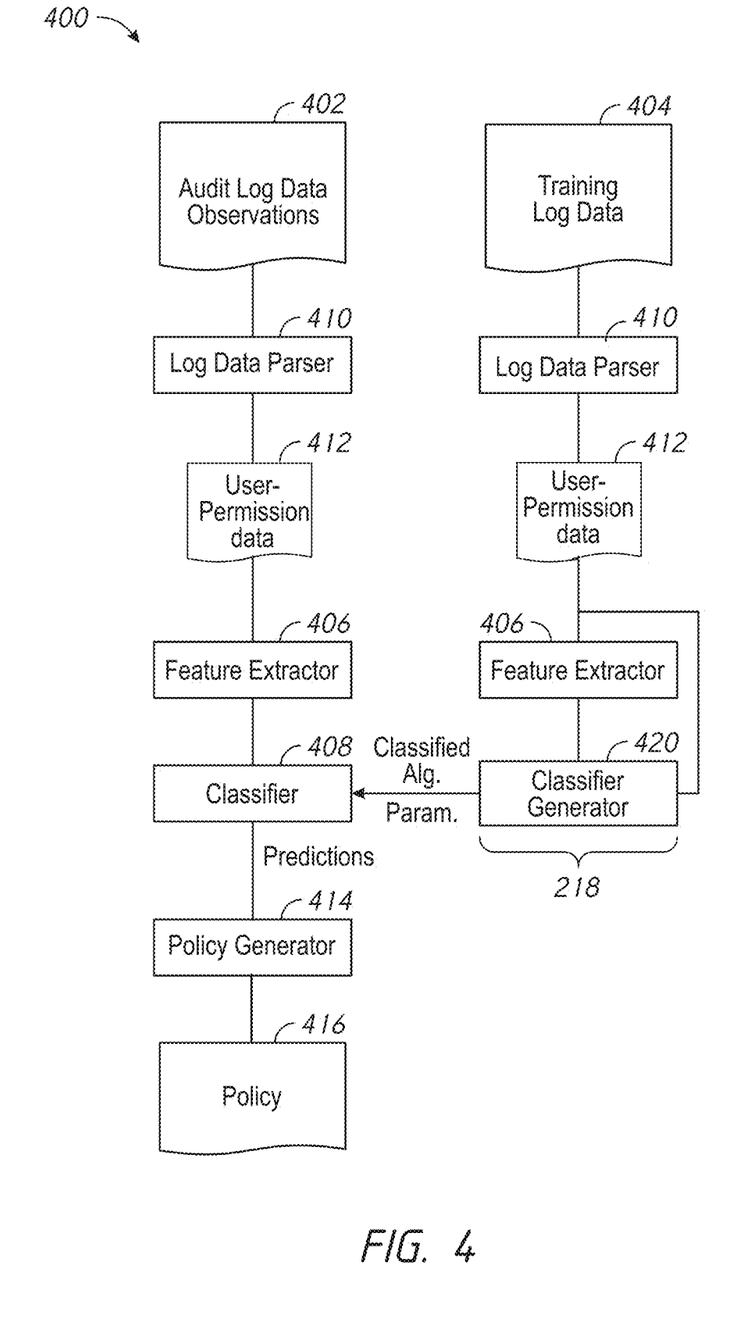
FIG. 4 is a diagram of an example privilege assignment system according to various aspects of the present disclosure.

In some or other scenarios, the privilege assignment system (e.g., 110 in FIG. 1) may have variations. FIG. 4 is a diagram of an example privilege assignment system, such as privilege assignment system 110 in the cloud system 100 (in FIG. 1), according to various aspects of the present disclosure. Privilege assignment system 400 may include a log data parser 410, which receives audit log data observations 402. The audit log data observations 402 may contain similar contents and collected in a similar manner as described in FIGS. 2 and 3. The log data parser 410 may also be configured in a similar manner as the log data parser 204 (in FIG. 2). Similar to FIG. 2, log data parser 410 may parse the log data 402 and generate user-permission data 412.

System 400 may further include a feature extractor 406 and a classifier 408. The feature extractor 406 extracts one or more features from the parsed log data for the classifier 408. For example, the features may include the time at which a permission was exercised. The features may also include a unique identifier of the executing entity and the type of entity. In some scenarios, such as in AWS, the type of entity may include user or a delegated role. The features may further include the service to which the action belonged, and the type of action performed. The features may also include the organization department to which the entity belongs. In some examples, in extracting the time when a permission was exercised, the feature extractor may use a time window instead of an absolute time. For example, the time at which a permission was exercised may include a weekend, weekday, and/or a specific day of the week. The classifier 408 may use one or more of the extracted features depending on availability. For example, in cases where the user's roles are not available (for small organizations), the classifier 408 may use fewer features.

In some scenarios, the classifier 408 generates a prediction of permissions for a user action. For example, the classifier 408 may include a decision tree (DT) classifier that implements a supervised learning algorithm. The DT classifier may provide advantages in speed and also has the ability to display the set of rules learned during classification. The DT classifier may be available in existing libraries, such as the scikit-learn library (see Pedregosa, F., et al., Scikit-learn: Machine Learning in Python, Journal of Machine Learning Research 12 (2011), 2825-2830). In some examples, the classifier 408 may be a binary classifier. In a non-limiting example, the classifier may generate a prediction of either granted or denied for each user action.

With further reference to FIG. 4, the system 400 may further include a training network 418 to train the classifier 408. In some examples, the training network 418 implements a supervised learning approach. For example, the training network 418 may include the log data parser 410, the feature extractor 406, and a classifier generator 420. The log data parser 410 may receive training log data 404 to generate the training user-permission data 412. The feature extractor 406 may generate training features based on the training user-permission data. In generating the training features, the same feature extractor 406 may be used. The classifier generator 420 may further receive the training features and train the classifier 408 by generating one or more classified algorithm parameters. The classifier generator may also use the same DT algorithm as in the classifier 408.

The feature extractor 406 may extract suitable features for training and classification. In some examples, the features extracted may include: username, service, action, and user identity type (e.g., whether the caller is a user or non-person entity). Additionally, and/or alternatively, the features may include one or more log entries such as the day of week, and whether the day was a weekend or weekday. In some examples, the system may derive the day from the event timestamp. Additionally, and/or alternatively, the features may include derived features from an action. For example, AWS actions include a verb and a noun placed together using CamelCase such as "DeleteInstance" or "CreateBucket." In an example, the system may determine the first word of actions, e.g., a verb, and use that "verb" as a derived feature. Based on the derived feature, the system may classify the action as either a Create, Read, Update, Delete, or Execute action. The system may use any suitable field in the logs as a feature either directly, or with some logic applied to derive features. For example, in AWS, log fields that could be used directly for features may include the sourceIPAddress, awsRegion, userAgent, and eventType.

In obtaining the training log data 404, the system may construct a training set of documents from the permissions exercised during the observation period and select a subset of previous data for creating the class labels. This is illustrated in line 3 of the pseudo code shown as below.

```
INPUT: UPE User-Permissions Exercised. The set of user-permissions exercised duringthe
observation period OBP
Input: PRMS The set of possible permissions
Input: TSP Training Set Parameters. Mapping of parameters used to build the trainingset
Input: CAP Classifier Algorithm Parameters. Mapping of parameters used to buildthe
predicted policy from a trained classifier
Input: PGP Policy Generation Parameters. Mapping of parameters used to build thepredicted
policy from a trained classifier
Output: policies Mapping storing the roles generated by each of the classifierinstances
    1           policies ← Ø;
    2           for t Params ∈ permute(TSP) do
    3        f eatureVector , labelSet←
                   createTrainingSet(t Params, U PE);
    4           for cl f Params ∈ permute(CAP) do
    5               cl f ← decisionTree(cl f Params);
    6               cl f ← clf.train( f eatureVector , labelSet );
```

-continued

```
7           for pParams ∈ permute(PGP) do
8               roles ← ∅;
9               possiblePrivs ←
                createPossiblePrivs(pParams, PRMS);
10              for user , perm ∈ possiblePrivs do
11                  if clf.predict(user , perm) = = 'granted' then
12                      rolesuser ← rolesuser ∪ perm;
13                  end
14              end
15              policiest Params,clf Params,pParams ← roles;
16          end
17      end
18  end
19  return policies
```

In generating the classifier, the classifier generator 420 may use the training set for each permutation of the Classifier Algorithm Parameters (CAP) (at lines 4-6 of pseudo code in preceding paragraph). These multiple instances of the classifier with different permutations of the CAP may be used for hyper-parameter selection using a "sliding simulation" method. The system 400 may further create a set of possible permissions that may be exercised during the operation period based on the Policy Generation Parameters (PGP) (line 9 of pseudo code in preceding paragraph). In training the classifier, each of the possible policy permissions is tested against the classifier which will predict that the permission should be either granted or denied, and the results of this classification are used to create the policy for the next operation period (lines 10-15 of pseudo code in preceding paragraph).

Now, a "sliding simulation" method is further explained. Several hyper-parameters may be selected for the classifier. For example, for the DT classifier, the parameters may include the parameters for the decision tree classifier, the parameters for constructions of the training set, and the parameters for the policy construction from the trained classifier. In some examples, selecting optimized hyper-parameters may be based on only out-of-sample data. For example, the classifier generator 420 may run multiple permutations of parameters in parallel on out-of-sample data and use the best performing parameters to create a future prediction. In some examples, a security policy is a prediction, and a weighted F measure, e.g., Fβ score, is used in the prediction. The Fβ may be calculated as:

$$F\beta = (1+\beta^2) \cdot Precision \cdot Recall/((\beta^2 \cdot Precision) + Recall)$$

A high value of weight β increases the importance of recall, while a low β values increases the importance of precision. While the recall and precision may correspond to under-privilege and over-privilege, respectively, in some examples, the classifier generator 420 may give more weight to reducing over-privilege. This may be aligned with an observation that some organizations are willing to accept more risk from over-privilege, which minimizes the cost of privileged entities not being able to perform their duties due to under-privilege.

In some examples, metrics other than the F measure may be used to balance between these competing goals of reducing over-privilege and also reducing under-privilege. For example, a simple arithmetic mean of precision and recall may be used. A combination of precision and recall, such as multiplication of the two, may also be used. A weighting variable can be used with the mean or product to allow a user (e.g., admin user) to favor minimizing over-privilege or under-privilege.

Returning to FIG. 4, the system 400 may further include a policy generator 414 that generates a policy based on the predictions from the classifier 408. For example, the predicted policy may include one or more permissions associated with each entity.

In some examples, the classifier generator 420 may also implement various optimization methods. For example, the classifier generator 420 may use a portion of the log data observations, for example, only the most recent exercised permissions. This may improve the performance of the system as training a classifier with older and less relevant permissions, which may have a negative effect on the prediction accuracy. In some examples, the audit log data 402 and training log data 404 may include completely separate data sets. For example, audit log data 402 and training log data 404 may be collected during separate periods, for example, the first month and second month, respectively. Alternatively, the audit log data 402 and training log data 404 may have overlapped data sets in time. For example, large amount of log data may be collected over a period of time, and segmented into time segments. A portion of the log data that includes multiple time segments (e.g., Tue-Fri) may be used for audit log data, and another portion of the log data comprising multiple time segments (e.g., Wed-Mon) may be used for training log data, where the audio log data and training log data span across the same time period.

Figure 5:
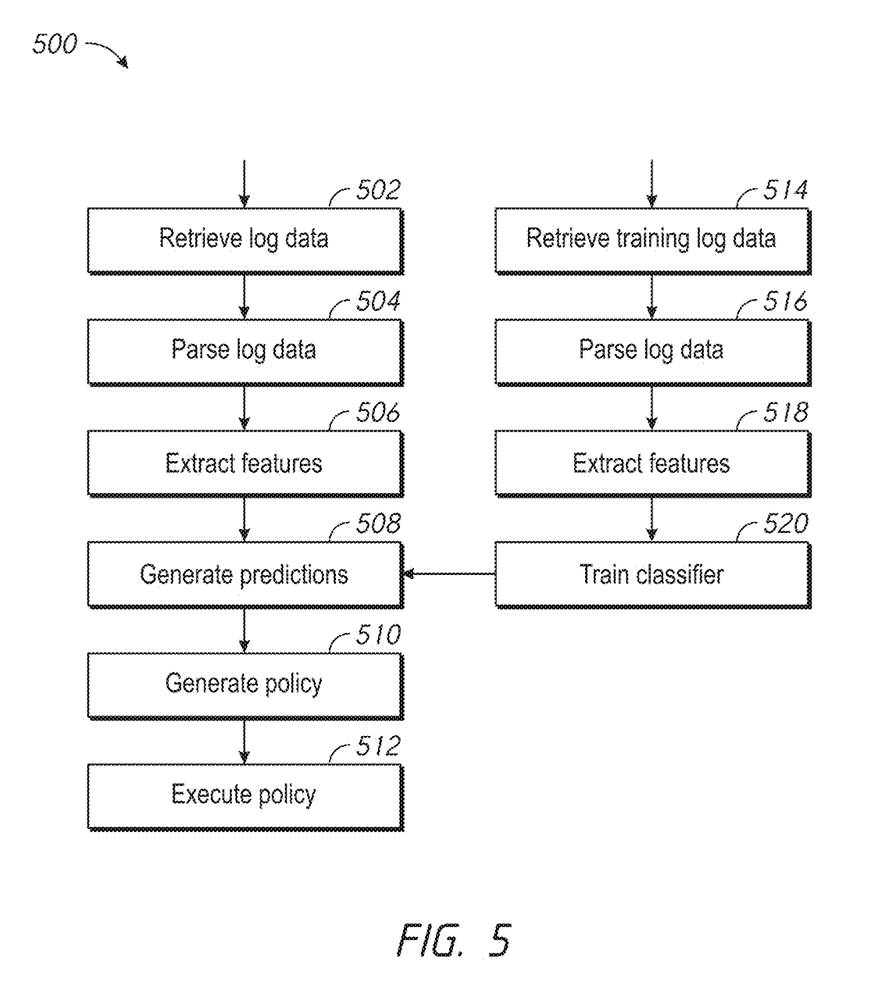
FIG. 5 illustrates an example of a process of generating a policy of access control according to various aspects of the present disclosure.

FIG. 5 illustrates an example of a process that can be implemented in a privilege assignment system, such as system 400 (in FIG. 4), to generate a policy of access control according to various aspects of the present disclosure. In some examples, process 500 may include receiving log data at 502. For example, process 500 may collect log data from users' accesses to multiple services in the cloud system (e.g., 100 in FIG. 1). In some scenarios, the log data may be collected in an observation period in a similar manner as described in system 400 (in FIG. 4). For example, the observation period may be a one day period, which may provide enough time for entities to complete tasks requiring related privileges. The observation period may also vary as the tasks vary.

In FIG. 5, process 500 may further include parsing log data at 504. For example, the process 500 may use the log data parser 410 (in FIG. 4) to generate user-permission data from the log data. Optionally, process 500 may further extract features from the log data at 506, where the extracted features may be used by a classifier. When extracting features at 506, any suitable feature extractors, such as feature extractor 406 (in FIG. 4), may be used. In a non-limiting example, multiple features may be extracted. The examples of the extracted features may include one or more of: the time at which a permission was exercised, a unique identifier of the executing entity, the type of entity, the service to which the action belonged, the type of action performed, and the organization department to which the entity belongs. In some scenarios, such as in AWS, the type of entity may include user or a delegated role.

Similarly, process 500 may also include receiving training log data at 514, parsing log data at 516 and extracting features at 518, and using the extracted features to train a classifier at 520. In some examples, parsing log data at 516 may implemented in a log data parser, such as parser 410 (in FIG. 4). Extracting features at 518 may be implemented in a feature extractor, such as 406 (in FIG. 4). Training the classifier at 520 may be implemented in a classifier generator, such as 420 (in FIG. 4).

Training the classifier at 520 may use any suitable classifier, for example, a DT classifier that implements a supervised learning algorithm. Process 500 may further include generating predictions at 508 from the extracted features based on a trained classifier, such as classifier 408 (in FIG. 4). In some examples, the trained classifier from 520 may be a binary classifier. In a non-limiting example, the classifier may generate a prediction of either granted or denied for each user action.

Process 500 may further include generating a policy at 510 based on the predictions generated at block 508. In some examples, the policy may include one or more permissions associated with each entity. Process 500 may include various optimization methods, such as in collecting log data in a similar manner as described in FIG. 4.

In FIG. 5, process 500 may further execute the policy at 512. For examples, the policy generated from the process 512 may include the assignment of roles, where a role is associated with one or more users, and the assignment of permissions for each role. When the policy is executed in the cloud system (e.g., 100 in FIG. 1), a user may be associated with a role, and a role is associated with one or more permissions. The cloud system may determine, based on the policy, whether a user's operation be granted. For example, when a user attempts to send a print job to a printer, the cloud system determines whether the privilege associated with the print job requested are granted by the permissions of the role(s) associated with the user. If the privilege associated with the print job are granted by a combination of the permissions of the role(s) associated with the user, then the requested job is granted. Otherwise, the user is denied of the operation requested.

In various embodiments in FIGS. 2-5, such as system 200 (in FIG. 2), system 400 (in FIG. 4), process 300 (in FIG. 3), and process 500 (in FIG. 5), training the classifier may also use time series decomposition to identify patterns in the log data and decomposes the log data into different models based on those patterns. For example, it is observed that there may be significant differences between the privileges exercised during weekdays and weekends. In some examples, time series decomposition may include filter decomposition. For example, the days (e.g., weekends) that do not fit into a chosen model (e.g., weekday) are filtered out of one or more observation periods in a sliding window before the data is used by the algorithms. In some examples, time series decomposition may also include filler decomposition. For example, the end date of a sliding window is used as a starting point. When determining an observation period, the system or process moves from the starting point backward until the observation period is "filled" with only data matching a chosen model. For example, consider a sliding window with a window size of 10 days. For the filter method, the number of days fitting the weekday model will vary from 6 to 8, and the number of days fitting the weekend model will vary from 2 to 4. For the filler method, the number of days fitting a model will always be 10 days when the sliding window size is 10 days.

Various embodiments described in FIGS. 1-5 provide advantages over existing systems and methods. For example, no pre-existing policy is necessary. The systems and processes may generate a policy based on audit log data. Further, decomposing the time series may provide several advantages. For example, in the filter method, less training data is needed for training the classifier, as the classifier does not need to learn the different behavior patterns in weekdays or weekends. Further, information about weekday or weekend patterns can be used in hyper-parameters that control the creation of the training set.

Figure 6:
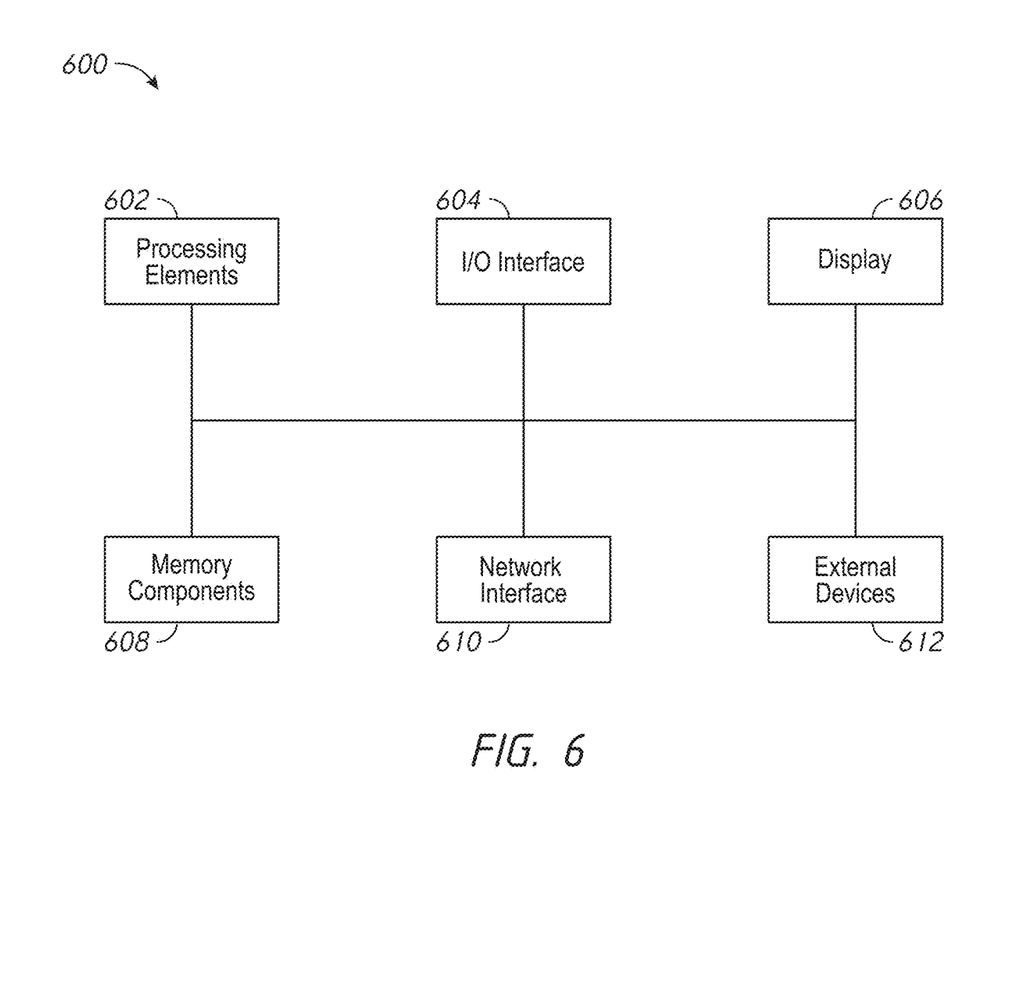
FIG. 6 is an example block diagram of a computing device that can be used to implement various systems and methods described herein.

FIG. 6 shows a simplified block structure for a computing device that may be used with the system 100 (in FIG. 1) or integrated into one or more components of the system. For example, the privilege assignment system 110, the service 104, and/or one or more devices 106 may include one or more of the components shown in FIG. 6 and be used to implement one or blocks or execute one or more of the operations disclosed in FIGS. 2-5. In FIG. 6, the computing device 600 may include one or more processing elements 602, an input/output interface 604, a display 606, one or more memory components 608, a network interface 610, and one or more external devices 612. Each of the various components may be in communication with one another through one or more busses, wireless means, or the like.

The processing element 602 may be any type of electronic device capable of processing, receiving, and/or transmitting instructions. For example, the processing element 602 may be a central processing unit, microprocessor, processor, or microcontroller. Additionally, it should be noted that some components of the computer 600 may be controlled by a first processor and other components may be controlled by a second processor, where the first and second processors may or may not be in communication with each other.

The memory components 608 are used by the computer 600 to store instructions for the processing element 602, as well as store data, such as the fluid device data, historical data, and the like. The memory components 608 may be, for example, magneto-optical storage, read-only memory, random access memory, erasable programmable memory, flash memory, or a combination of one or more types of memory components.

The display 606 provides visual feedback to a user and, optionally, can act as an input element to enable a user to control, manipulate, and calibrate various components of the computing device 600. The display 606 may be a liquid crystal display, plasma display, organic light-emitting diode display, and/or cathode ray tube display. In embodiments where the display 606 is used as an input, the display may include one or more touch or input sensors, such as capacitive touch sensors, resistive grid, or the like.

The I/O interface 604 allows a user to enter data into the computer 600, as well as provides an input/output for the computer 600 to communicate with other devices or services (e.g., services 104 in FIG. 1, other computers, speakers, etc.). The I/O interface 604 can include one or more input buttons, touch pads, and so on.

The network interface 610 provides communication to and from the computer 600 to other devices. For example, the network interface 610 allows the device 106 to communicate with one or more services 104 through the network 102 (in FIG. 1). The network interface 610 includes one or more communication protocols, such as, but not limited to WiFi, Ethernet, Bluetooth, and so on. The network interface 610 may also include one or more hardwired components, such as a Universal Serial Bus (USB) cable, or the like. The configuration of the network interface 610 depends on the types of communication desired and may be modified to communicate via WiFi, Bluetooth, and so on.

The external devices 612 are one or more devices that can be used to provide various inputs to the computing device 600, e.g., mouse, microphone, keyboard, trackpad, or the like. The external devices 612 may be local or remote and may vary as desired.

The foregoing description has a broad application. For example, while examples disclosed herein may focus on a cloud system, it should be appreciated that the concepts disclosed herein may equally apply to access control and policy management in other systems, such as a distributed, central or decentralized system. For example, privilege assignment system (e.g., 110 in FIG. 1) may be residing on a server in a client/server system. The privilege assignment system may also be residing on any device on the network and operate in a decentralized manner. Accordingly, the disclosure is meant only to provide examples of various systems and methods and is not intended to suggest that the scope of the disclosure, including the claims, is limited to these examples.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The drawings are for purposes of illustration only and the dimensions, positions, order and relative sizes reflected in the drawings attached hereto may vary. In each of the figures, like numerals represent like items throughout the figures.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

From the foregoing it will be appreciated that, although specific embodiments of the present disclosure have been described herein for purposes of illustration, various modifications and combinations may be made without deviating from the spirit and scope of the present disclosure. The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An access control system comprising:
   a processor;
   a log data parser configured to cause the processor to receive log data observations in a cloud system and extract user-permission data from the log data observations, wherein the log data observations include one or more user actions performed by one or more users in the cloud system;
   a feature extractor configured to cause the processor to extract one or more features from the user-permission data;
   a classifier configured to cause the processor to generate predictions of permissions for the one or more users based on the extracted one or more features, wherein each prediction includes one or more permissions associated with each of the one or more users; and
   a clustering unit configured to cause the processor to use the predictions of permissions to generate one or more clusters; and
   a policy generator configured to cause the processor to generate an access control policy by associating each cluster to the one or more users and assigning permissions to each cluster.

2. The access control system of claim 1 further comprising a vectorizer configured to convert the user-permission data to one or more vectors.

3. The access control system of claim 2, wherein the vectorizer includes at least a term frequency-inverse document frequency (TF-IDF) vectorizer.

4. The access control system of claim 1, wherein:
   the clustering unit is further configured to generate one or more outliers, each outlier is associated with a user; and
   the policy generator is further configured to assign permissions to each of the outliers by:
      determining privileges used by the user associated with the outlier; and
      assigning the privileges to the outlier.

5. The access control system of claim 1 is further configured to:
   receive, from a user device associated with a user, a request to access a service in the cloud system; and
   execute the access control policy to determine whether to grant the request based on a permission of the user associated with the user device.

6. The access control system of claim 1, wherein the policy generator is configured to assign the permissions to each cluster by:
   determining permissions exercised by the one or more users associated with the cluster; and
   assigning a combined permission to the cluster, wherein the combined permission includes all of the permissions exercised by the one or more users associated with the cluster.

7. The access control system of claim 1, wherein the clustering unit is configured to use a density-based spatial clustering of applications with noise (DBSCAN) algorithm.

8. A method of controlling access in a cloud system, the method comprising:
   receiving log data observations recorded from the cloud system;
   parsing user-permission data from the log data observations;

extracting one or more features from the user-permission data;
generating, by a classifier, predictions of permissions for the one or more users based on the extracted one or more features, wherein each prediction includes one or more permissions associated with each of the one or more users;
clustering the user-permission data, based on the predictions of permissions, to generate one or more clusters;
generating an access control policy by associating each cluster to one or more users and assigning permissions to each cluster;
receiving, from a user device associated with a user, a request to access a service in the cloud system; and
executing the access control policy to determine whether to grant the request based on a permission of the user associated with the user device.

9. The method of claim 8 further comprising:
generating one or more outliers, each outlier associated with a user; and
processing the one or more outliers by:
determining privileges used by the user associated with each of the one or more outliers; and
assigning privileges to one of the one or more outliers based on the privileges used by the user associated with that outlier.

10. The method of claim 8, wherein assigning the permissions to each cluster comprises:
determining permissions exercised by the one or more users associated with the cluster; and
assigning a combined permission to the cluster, wherein the combined permission includes all of the permissions exercised by the one or more users associated with the cluster.

11. An access control system comprising:
a processor;
a log data parser configured to cause the processor to receive log data observations in a cloud system and extract user-permission data from the log data observations, wherein the log data observations include one or more user actions in the cloud system by one or more users;
a feature extractor configured to cause the processor to extract one or more features from the user-permission data;
a classifier configured to cause the processor to generate predictions of permissions for the one or more users based on the extracted one or more features, wherein each prediction includes one or more permissions associated with each of the one or more users; and
a policy generator configured to cause the processor to generate an access control policy based on at least one of the predictions of permissions for the one or more users.

12. The access control system of claim 11 further comprising a training network configured to train the classifier by:
receiving a training log data, wherein the training log data includes one or more training user actions in the cloud system by the one or more users;
extracting training user-permission data from the training log data;
extracting one or more training features from the training user-permission data; and
using the extracted training features to train the classifier.

13. The access control system of claim 12, wherein the classifier includes a decision-tree (DT) classifier.

14. The access control system of claim 12, wherein the training network is configured to:
determine first permissions associated with the one or more users in a first operation period;
determine first predictions of permissions associated with the one or more users in the first operation period;
compare the first predictions and the first permissions from the first operation period; and
determine second predictions of permissions in a second operation period based on the comparison between the first predictions and the first permissions.

15. The access control system of claim 14, wherein the training network is configured to compare the first predictions and the first permissions from the first operation period by:
using the first permissions to test the first predictions to determine a precision and a recall; and
determining a F measure based on the precision and the recall.

16. A method of controlling access in a cloud system, the method comprising:
receiving log data observations recorded from the cloud system;
parsing user-permission data from the log data observations, wherein the log data observations include one or more user actions in the cloud system by one or more users;
extracting one or more features from the user-permission data;
generating, by a classifier, predictions of permissions for the one or more users based on the extracted one or more features, wherein each prediction includes one or more permissions associated with each of the one or more users;
generating an access control policy based on at least one of the predictions of permissions for the one or more users;
receiving, from a user device associated with a user, a request to access a service in the cloud system; and
executing the access control policy to determine whether to grant the request based on a permission of the user associated with the user device.

17. The method of claim 16 further comprising training the classifier by:
receiving a training log data, wherein the training log data includes one or more training user actions in the cloud system by the one or more users;
extracting training user-permission data from the training log data;
extracting one or more training features from the training user-permission data; and
using the extracted training features to train the classifier.

18. The method of claim 17, wherein the classifier includes a decision-tree (DT) classifier.

19. The method of claim 17, wherein training the classifier comprises:
determining first permissions associated with the one or more users in a first operation period;
determining first predictions of permissions associated with the one or more users in the first operation period;
comparing the first predictions and the first permissions from the first operation period; and
determining second predictions of permissions in a second operation period based on the comparison between the first predictions and the first permissions.

20. The method of claim 19, wherein comparing the first predictions and the first permissions from the first operation period comprises:
 using the first permissions to test the first predictions to determine a precision and a recall; and
 determining a F measure based on the precision and the recall.

* * * * *